United States Patent
Onishi et al.

(10) Patent No.: US 10,488,182 B2
(45) Date of Patent: Nov. 26, 2019

(54) OPTICAL MEASUREMENT DEVICE, OPTICAL MEASUREMENT METHOD, AND ROTATING MACHINE

(71) Applicant: MITSUBISHI HEAVY INDUSTRIES, LTD., Tokyo (JP)

(72) Inventors: Tomoyuki Onishi, Tokyo (JP); Takahiro Miyamoto, Tokyo (JP); Akio Kondou, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/084,344

(22) PCT Filed: Mar. 16, 2017

(86) PCT No.: PCT/JP2017/010574
§ 371 (c)(1),
(2) Date: Sep. 12, 2018

(87) PCT Pub. No.: WO2017/159770
PCT Pub. Date: Sep. 21, 2017

(65) Prior Publication Data
US 2019/0033061 A1 Jan. 31, 2019

(30) Foreign Application Priority Data

Mar. 18, 2016 (JP) .................................. 2016-054851

(51) Int. Cl.
*G01B 11/14* (2006.01)
*F01D 25/00* (2006.01)
(Continued)

(52) U.S. Cl.
CPC ............ *G01B 11/14* (2013.01); *F01D 21/003* (2013.01); *F01D 25/00* (2013.01); *G01B 5/0014* (2013.01);
(Continued)

(58) Field of Classification Search
CPC ...... G01B 11/14; G01B 5/0014; F01D 21/003; F01D 25/00; F05D 2220/30; F05D 2270/804
(Continued)

(56) References Cited

U.S. PATENT DOCUMENTS 4,766,323 A  8/1988 Franklin et al.
7,027,166 B2  4/2006 Luetche et al.
(Continued)

FOREIGN PATENT DOCUMENTS

JP  59-142408 A  8/1984
JP  2004-191374 A  7/2004
(Continued)

OTHER PUBLICATIONS

International Search Report dated Jun. 6, 2017, issued in counterpart International Application No. PCT/JP2017/010574, with English translation. (8 pages).
(Continued)

*Primary Examiner* — Isiaka O Akanbi
(74) *Attorney, Agent, or Firm* — Westerman, Hattori, Daniels & Adrian, LLP (57) ABSTRACT

There is provided: a pair of slanted fiber groups; a pair of parallel fiber groups; a light source for emitting two slanted light beams from a pair of slanted light-emitting fibers, and emitting two parallel light beams from a pair of parallel light-emitting fibers; a target provided to the outer peripheral surface of a rotor; a pair of light-receiving elements for detecting the intensity of light received by each of a pair of slanted light-receiving fibers; a pair of light-receiving elements for detecting the intensity of light received by each of a pair of parallel light-receiving fibers; and a computation unit for performing a computation that includes an interval affected by thermal elongation on the basis of four wave-
(Continued)

forms indicating changes in the intensity detected by each of the light-receiving elements.

10 Claims, 7 Drawing Sheets

(51) Int. Cl.
*F01D 21/00* (2006.01)
*G01B 5/00* (2006.01)
*F01D 11/14* (2006.01)

(52) U.S. Cl.
CPC .......... *F01D 11/14* (2013.01); *F05D 2220/30* (2013.01); *F05D 2270/804* (2013.01)

(58) Field of Classification Search
USPC .................................................. 356/600–625
See application file for complete search history.

(56) References Cited

U.S. PATENT DOCUMENTS

| | | | |
|---|---|---|---|
| 2004/0114154 A1* | 6/2004 | Luetche | G01S 17/48 356/615 |
| 2017/0276475 A1* | 9/2017 | Morino | G01B 11/14 |
| 2017/0307437 A1* | 10/2017 | Staehle-Bouliane | G01H 9/006 |
| 2019/0086195 A1* | 3/2019 | Onishi | G01B 11/18 |

FOREIGN PATENT DOCUMENTS

| | | |
|---|---|---|
| JP | 4429705 B2 | 3/2010 |
| JP | 2015-1414 A | 1/2015 |

OTHER PUBLICATIONS

Written Opinion dated Sep. 27, 2018, issued in counterpart International Application No. PCT/JP2017/010574. (6 pages).

* cited by examiner

OPTICAL MEASUREMENT DEVICE, OPTICAL MEASUREMENT METHOD, AND ROTATING MACHINE

TECHNICAL FIELD

The present invention relates to optical measurement devices, optical measurement methods, and rotating machines.

BACKGROUND ART

To improve performance of a rotating machine, such as a turbine, the gap (tip clearance) between the rotary part (for example, the blades) and the stationary part (for example, the casing) needs to be small. Methods to measure the clearance include optical clearance measurement. In the optical clearance measurement, passing timings of the blades or an reflective target are detected, and the time difference information is used for calculation in accordance with the triangulation method.

Figure 5A:
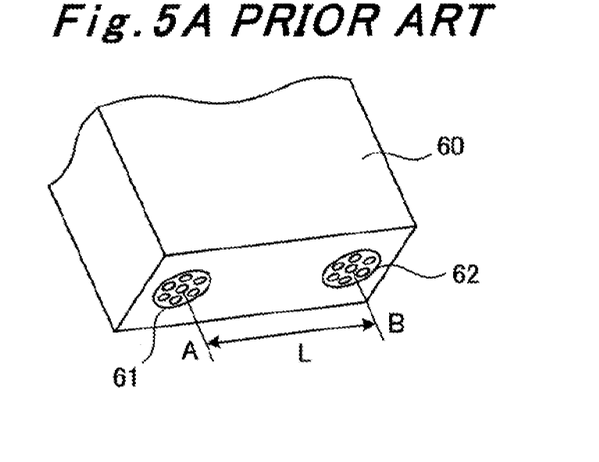
FIG. 5A shows a diagram illustrating a perspective view of the distal end of a conventional light sensor of an optical fiber type.
Figure 5B:
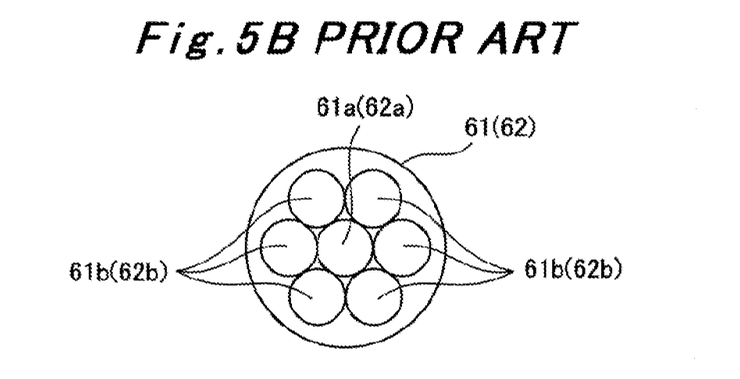
FIG. 5B shows a diagram illustrating an enlarged view of an optical fiber bundle in the conventional light sensor of an optical fiber type.

In the optical clearance measurement, a light sensor 60 using optical fibers as illustrated in FIG. 5A is used. This light sensor 60 has a pair of optical fiber bundles 61 and 62 slanted to form two sides of a triangle in triangulation (see FIG. 6 described later). As illustrated in FIG. 5B, the optical fiber bundle 61 includes one light-emitting fiber 61a that emits light and multiple light-receiving fibers 61b that receive light. The one light-emitting fiber 61a is positioned at the center, around which are arranged multiple light-receiving fibers 61b (Patent Document 1). The optical fiber bundle 62 also has the same structure as that of the optical fiber bundle 61, including a light-emitting fiber 62a and light-receiving fibers 62b.

The measurement principle of the above light sensor 60 will be described with reference to FIGS. 6 and 7. Here, assume that the distal end portion of a blade 71 which serves as the reflection target is measured. During measurement, light is emitted from each of the light-emitting fiber 61a in the optical fiber bundle 61 and the light-emitting fiber 62a in the optical fiber bundle 62. When the rotating blade 71 passes by position C, the light-receiving fibers 61b in the optical fiber bundle 61 receive light reflected from the blade 71 at time t1. After that, when the rotating blade 71 passes by position D, the light-receiving fibers 62b in the optical fiber bundle 62 receive light reflected from the blade 71 at time t2.

Figure 7:
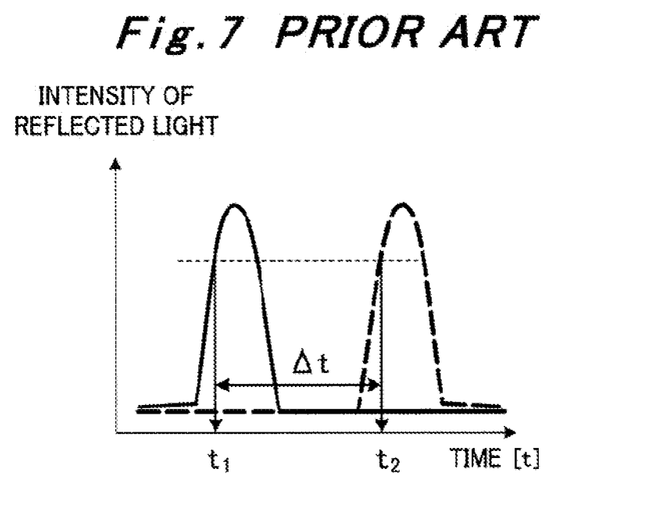
FIG. 7 is a graph showing change in the intensity of reflected light measured with the light sensor illustrated in FIG. 5.

In this way, when the blade 71 passes by two light beams from the pair of light-emitting fibers 61a and 62a, two waveforms (changes in intensity of the reflected light) shifted from each other by time difference Δt are obtained as illustrated in the graph of FIG. 7. From the two waveforms, time difference Δt is calculated.

Figure 6:
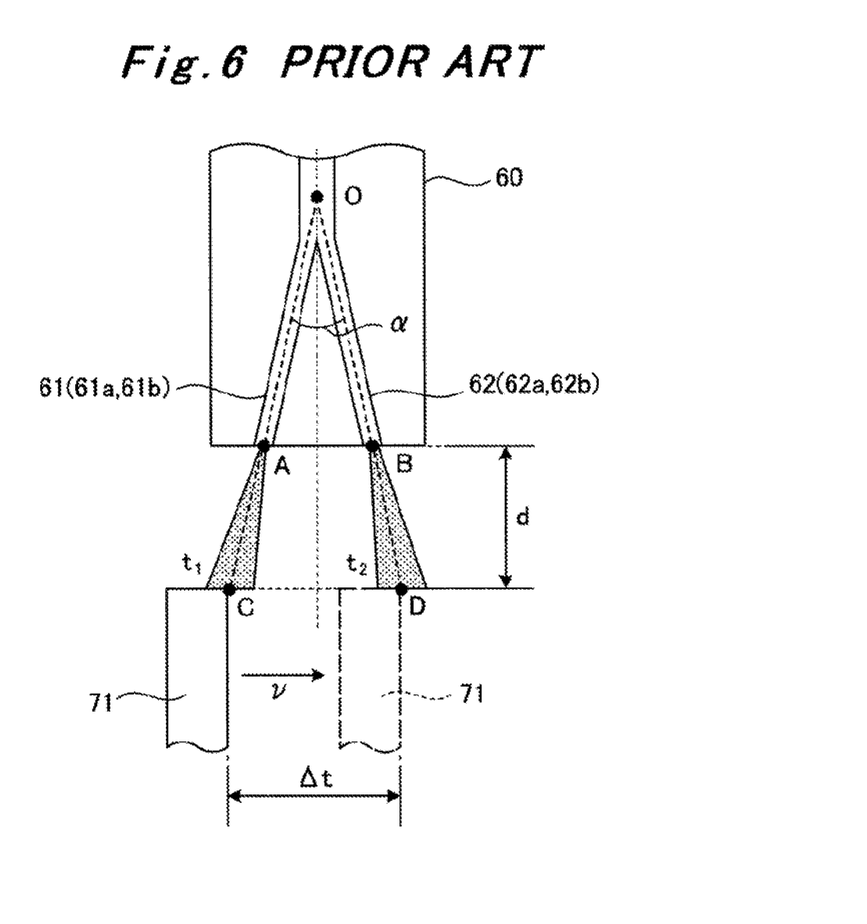
FIG. 6 is a diagram for explaining the measurement principle of the light sensor illustrated in FIG. 5.

Here, in FIG. 6, the distance from the distal end of the light sensor 60 to the distal end of the blade 71, in other words, the clearance is represented by d. The angle formed by two light beams outputted from the pair of light-emitting fibers 61a and 62a is represented by α. The interval between the distal ends of the pair of light-emitting fibers 61a and 62a, in other words, interval AB is represented by L. The peripheral speed of the blade 71 is represented by v; the rotation radius of the blade 71, R; and the revolution speed of the blade 71, N. Then, interval CD is expressed as $v \times \Delta t = 2 \times R \times \pi \times N \times \Delta t$, and clearance d can be calculated by the following formula 1. Note that revolution speed N is acquired separately, using a pulse meter or the like.

[Math. 1]

$$d = \frac{\frac{1}{2}\overline{CD}}{\tan\frac{\alpha}{2}} - \frac{\frac{1}{2}\overline{AB}}{\tan\frac{\alpha}{2}} = \frac{\frac{1}{2} \times v \times \Delta t}{\tan\frac{\alpha}{2}} - \frac{\frac{1}{2} \times L}{\tan\frac{\alpha}{2}} = \frac{\frac{1}{2} \times 2 \times R \times \pi \times N \times \Delta t}{\tan\frac{\alpha}{2}} - \frac{\frac{1}{2} \times L}{\tan\frac{\alpha}{2}} \quad \text{(Formula 1)}$$

Figure 8:
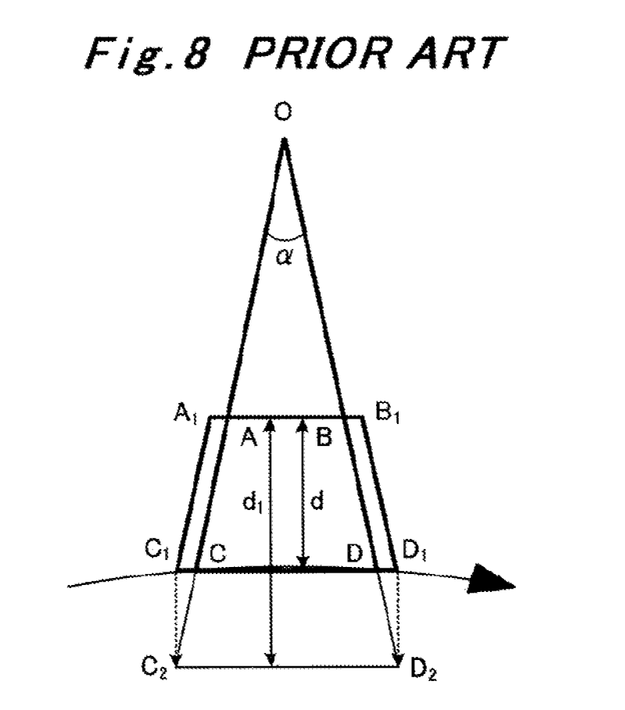
FIG. 8 is a diagram for explaining measurement problems in the light sensor illustrated in FIG. 5.

Specifically, "angle α", "interval AB", and "interval CD" are parameters necessary for triangulation and correspond to "the angle of the small triangle", "the base of the small triangle", and "the base of the large triangle", respectively, as illustrated in FIG. 8. Since angle α and interval AB are known parameters, interval CD can be calculated from time difference Δt between the two waveforms, and clearance d can be calculated as a result.

PRIOR ART DOCUMENT

Patent Document

Patent Document 1: Japanese Patent No. 4429705

SUMMARY OF THE INVENTION

Problems to be Solved by the Invention

When the above clearance measurement is performed in a high-temperature atmosphere, the following error factors (1) and (2) need to be considered.

(1) Interval AB changes due to thermal elongation of the light sensor 60, adding errors to measured values.
(2) Radius R changes due to thermal elongation or centrifugal elongation of the rotary part, adding errors to measured values.

The above (1) will be described specifically with reference to FIG. 8. For example, in the case where the light sensor 60 having a stainless steel housing is heated to 600° C., interval $A_1B_1$ at 600° C. increases by 1%, compared to interval AB before thermal elongation. In this case, the time difference of crossing the two light beams will also increase by 1%. In other words, it means that interval $C_1D_1$ at 600° C. increases by 1%, compared to interval CD before the thermal elongation.

In this state, it means that in the triangle in triangulation before the thermal elongation, the blade 71 seemingly passes by position $C_2$ and position $D_2$ on the two light beams (the extension of line segment OA and the extension of line segment OB). As a result, the clearance will be determined by calculation not as d which is the true value but as $d_1$ which is larger than d. In this way, if interval AB changes due to thermal elongation on the light sensor 60 side, an error will be added to the measured value.

The above (2) will also be described specifically with reference to FIG. 8. As described above, peripheral speed v is expressed as $v=2 \times R \times \pi \times N$, and thus, peripheral speed v is calculated using radius R and revolution speed N acquired using a pulse meter or the like. Then, since this radius R changes due to centrifugal elongation or thermal elongation, the radius R is a cause of errors. For example, in the case where the linear expansion coefficient of the material of the blade 71 is $1.5 \times 10^{-5}$, and the temperature of the blade increases by 600° C., the thermal elongation (thermal strain)

is $1.5 \times 10^{-5} \times 600 \times 100 = 0.9\%$. This means that even when revolution speed N is the same, peripheral speed v increases by 0.9% due to the thermal elongation. In other words, it means that interval $C_1D_1$ after temperature rise by 600° C. increases by 0.9%, compared to interval CD before the thermal elongation.

In this state, it means that in the triangle in triangulation before the thermal elongation, the blade 71 seemingly passes by position $C_2$ and position $D_2$ on the two light beams (the extension of line segment OA and the extension of line segment OB). As a result, the clearance will be determined by calculation not as d which is the true value but as $d_1$ which is larger than d. In this way, if radius R changes due to thermal elongation or centrifugal elongation on the rotary side, peripheral speed v and distance CD change, adding an error to the measured value.

As described above, the difference between the true clearance d and the calculated $d_1$ described above has influence as a factor of measurement errors. Therefore, it is desired to eliminate errors resulting from thermal elongation and centrifugal elongation.

The present invention is made in view of the above problems, and an objective thereof is to provide an optical measurement device, an optical measurement method and a rotating machine that eliminate errors resulting from thermal elongation and centrifugal elongation.

Means for Solving the Problems

An optical measurement device according to a first aspect of the invention to solve the above problems, comprises:

a pair of first fiber bundles having a pair of first light-emitting fibers, distal ends of which are arranged at a specified interval, and a pair of first light-receiving fibers, distal ends of which are arranged at the specified interval, in a light sensor, the pair of first fiber bundles being arranged to be slanted to respectively form two sides of a triangle in triangulation;

a pair of second fiber bundles having a pair of second light-emitting fibers, distal ends of which are arranged at the specified interval, and a pair of second light-receiving fibers, distal ends of which are arranged at the specified interval, in the light sensor, the pair of second fiber bundles being arranged in parallel with each other;

a light source that outputs light to the pair of first light-emitting fibers and the pair of second light-emitting fibers to emit two slanted light beams from the pair of first light-emitting fibers and emit two parallel light beams from the pair of second light-emitting fibers;

a target that is provided on an outer peripheral surface of a rotary member, reflects the two slanted light beams to the pair of first light-receiving fibers, respectively, and reflects the two parallel light beams to the pair of second light-receiving fibers, respectively;

a pair of first light-receiving elements each of which is connected to the corresponding one of the pair of first light-receiving fibers and detects intensity of the light received by the first light-receiving element;

a pair of second light-receiving elements each of which is connected to the corresponding one of the pair of second light-receiving fibers and detects intensity of the light received by the second light-receiving element; and a computation unit that performs calculation including the specified interval affected by thermal elongation, using four waveforms indicating changes in the intensity respectively detected by the pair of first light-receiving elements and the pair of second light-receiving elements.

An optical measurement device according to a second aspect of the invention to solve the above problems is the optical measurement device according to the above first aspect of the invention, wherein the computation unit calculates a first time difference from two times of a rising edge and a falling edge of each of the four waveforms and calculates a peripheral speed of the target, using one of the four first time differences or an average of two or more of the four first time differences, calculates a second time difference from two times at which the target passes by the two parallel light beams using two of the waveforms detected by the pair of second light-receiving elements and calculates the specified interval affected by thermal elongation using the second time difference, and calculates a third time difference from two times at which the target passes by the two slanted light beams using two of the waveforms detected by the pair of first light-receiving elements and calculates distance from the distal ends of the pair of first light-emitting fibers to the target using the third time difference.

An optical measurement device according to a third aspect of the invention to solve the above problems is the optical measurement device according to the above first or second aspect of the invention, wherein the light source has a first light source that outputs first light to the pair of first light-emitting fibers and a second light source that outputs second light with a wavelength different from a wavelength of the first light to the pair of second light-emitting fibers, and the optical measurement device further includes a first filter that is provided between the pair of first light-receiving fibers and the pair of first light-receiving elements and transmits only the first light and a second filter that is provided between the pair of second light-receiving fibers and the pair of second light-receiving elements and transmits only the second light.

A rotating machine according to a fourth aspect of the invention to solve the above problems, comprises the optical measurement device according to any one of the above first to third aspects of the invention.

An optical measurement method according to a fifth aspect of the invention to solve the above problems comprises:

arranging, in a light sensor, a pair of first fiber bundles having a pair of first light-emitting fibers, distal ends of which are arranged at a specified interval, and a pair of first light-receiving fibers, distal ends of which are arranged at the specified interval, such that the pair of first fiber bundles are slanted to respectively form two sides of a triangle in triangulation;

arranging, in the light sensor, a pair of second fiber bundles having a pair of second light-emitting fibers, distal ends of which are arranged at the specified interval, and a pair of second light-receiving fibers, distal ends of which are arranged at the specified interval, such that the pair of second fiber bundles are in parallel with each other;

outputting light from a light source to the pair of first light-emitting fibers and the pair of second light-emitting fibers to emit two slanted light beams from the pair of first light-emitting fibers and emit two parallel light beams from the pair of second light-emitting fibers;

reflecting the two slanted light beams to the pair of first light-receiving fibers, respectively, and reflecting the two parallel light beams to the pair of second light-receiving fibers, respectively, using a target provided on an outer peripheral surface of a rotary member;

detecting, using each of a pair of first light-receiving elements connected to the corresponding one of the pair of first light-receiving fibers, intensity of the light received by the first light-receiving element;

detecting, using each of a pair of second light-receiving elements connected to the corresponding one of the pair of second light-receiving fibers, intensity of the light received by the second light-receiving element; and performing calculation including the specified interval affected by thermal elongation, using four waveforms indicating changes in the intensity respectively detected by the pair of first light-receiving elements and the pair of second light-receiving elements.

An optical measurement method according to a sixth aspect of the invention to solve the above problems is the optical measurement method according to the above fifth aspect of the invention, further comprising:

calculating a first time difference from two times of a rising edge and a falling edge of each of the four waveforms and calculating a peripheral speed of the target using one of the four first time differences or an average of two or more of the four first time differences;

calculating a second time difference from two times at which the target passes by the two parallel light beams using two of the waveforms detected by the pair of second light-receiving elements and calculating the specified interval affected by thermal elongation using the second time difference; and calculating a third time difference from two times at which the target passes by the two slanted light beams using two of the waveforms detected by the pair of first light-receiving elements and calculating distance from the distal ends of the pair of first light-emitting fibers to the target using the third time difference.

Effect of the Invention

The present invention eliminates errors resulting from thermal elongation on the light sensor side by calculating the interval affected by the thermal elongation of the light sensor. In addition, the present invention also eliminates errors resulting from thermal elongation and centrifugal elongation on the rotary side by calculating the peripheral speed of the rotary side instead of using the radius of the rotary side for the calculation.

MODE FOR CARRYING OUT THE INVENTION

Hereinafter, an embodiment of an optical measurement device, optical measurement method, and rotating machine according to the present invention will be described with reference to FIGS. 1 to 4. Note that although here, a rotor is illustrated as a rotary member of the rotating machine, the present invention can be used for shafts and turbines as rotary members.

EXAMPLE 1

Figure 1:
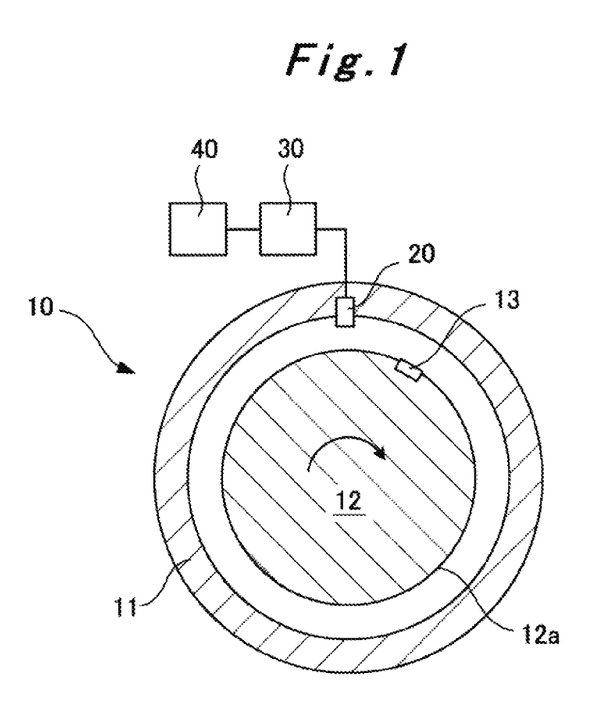
FIG. 1 is a schematic diagram illustrating an example (Example 1) of an embodiment of an optical measurement device and a rotating machine according to the present invention.

As illustrated in FIG. 1, An optical measurement device in this example has a target 13, light sensor 20, light signal processor 30, and light signal computation unit 40. A rotating machine 10 has a casing 11 which is a stationary part and a rotor 12 (rotary member) which is a rotary part and rotatably supported inside the casing 11. The light sensor 20 is attached to the casing 11 so as to face the outer peripheral surface 12a of the rotor 12.

The target 13 is fixed on the outer peripheral surface 12a of the rotor 12 so as to reflect light incident from the light sensor 20. This target 13 is made of material that has a small thermal elongation property (small liner expansion coefficient), for example, quarts or ceramic plate material, and has a specified width w. It is preferable that the target 13 have a high reflectance of the light beam incident from the light sensor 20. Hence, for example, the quarts or ceramic plate material may have a color having a high reflectance, or highly reflective material may be coated on the surface the quarts or ceramic plate material.

Figure 2A:
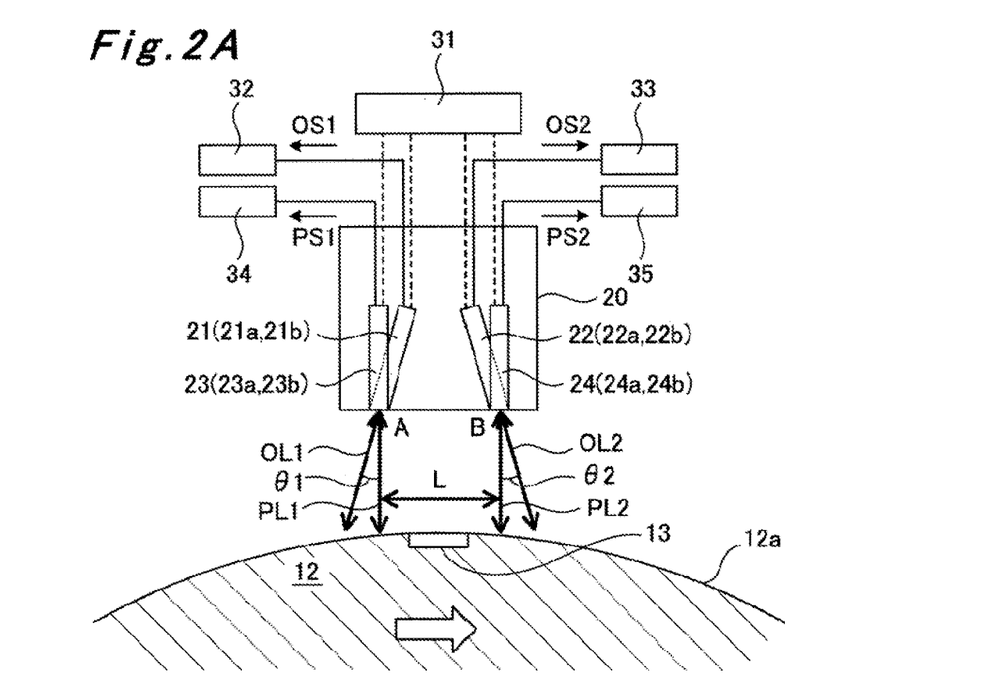
FIG. 2A shows a structure diagram illustrating the device structure of the optical measurement device illustrated in FIG. 1.

As illustrated in FIG. 2A, the light sensor 20 has a pair of slanted fiber bundles 21 and 22 (first fiber bundles) and a pair of parallel fiber bundles 23 and 24 (second fiber bundles). The pair of slanted fiber bundles 21 and 22 are arranged to be slanted so as to form two sides of a triangle in triangulation, and the pair of parallel fiber bundles 23 and 24 are arranged to be in parallel to each other.

Figure 2B:
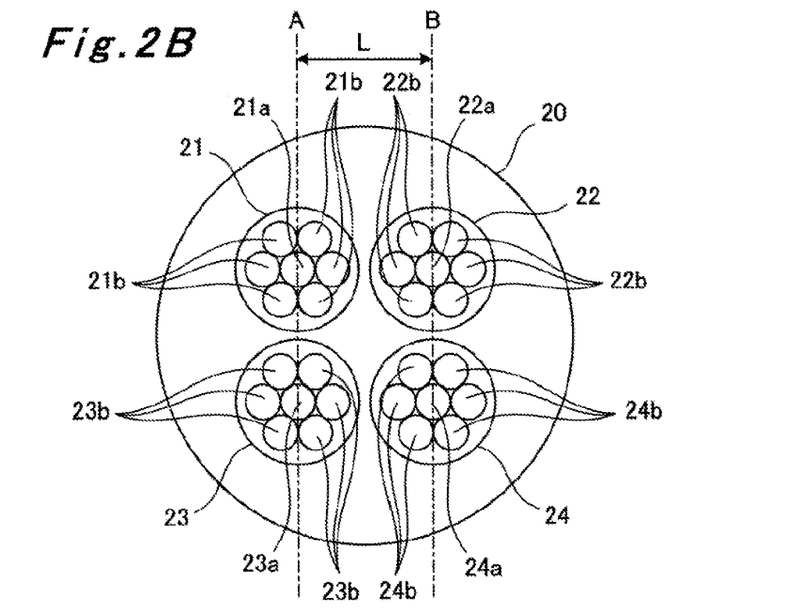
FIG. 2B shows a diagram illustrating the arrangement of optical fiber bundles of the optical measurement device illustrated in FIG. 1.

As illustrated in FIG. 2B, the slanted fiber bundle 21 includes one slanted light-emitting fiber 21a (first light-emitting fiber) and multiple slanted light-receiving fibers 21b (first light-receiving fibers), and the one slanted light-emitting fiber 21a is positioned at the center, around which is arranged the multiple slanted light-receiving fibers 21b. The slanted fiber bundle 22 including one slanted light-emitting fiber 22a (first light-emitting fiber) and multiple slanted light-receiving fibers 22b (first light-receiving fibers) has the same arrangement as for the slanted fiber bundle 21 as illustrated in FIG. 2B.

In addition, the parallel fiber bundle 23 including one parallel light-emitting fiber 23a (second light-emitting fiber) and multiple parallel light-receiving fibers 23b (second light-receiving fibers) and the parallel fiber bundle 24 including one parallel light-emitting fiber 24a (second light-emitting fiber) and multiple parallel light-receiving fibers 24b (second light-receiving fibers) have the same arrangement as for the slanted fiber bundle 21 as illustrated in FIG. 2B.

Note that although here the multiple light-receiving fibers are arranged in a single layer around each one of the light-emitting fibers, the multiple light-receiving fibers may be arranged in two layers, or three or more layers, or the number of center light-emitting fibers may be increased.

As for the positions at the distal end of the light sensor 20 (the positions along the circumferential direction of the rotor 12), the distal ends of the slanted light-emitting fiber 21a and the parallel light-emitting fiber 23a are arranged at the same position, position A; the distal ends of the slanted light-emitting fiber 22a and the parallel light-emitting fiber 24a are arranged at the same position, position B. In other words, the interval AB between the distal ends of the slanted light-emitting fiber 21a and the slanted light-emitting fiber 22a and the interval AB between the distal ends of the parallel light-emitting fiber 23a and the parallel light-emitting fiber 24a are the same length L.

The light signal processor 30 has one light source 31 and multiple light-receiving elements 32 to 35. The light source 31 is, for example, a laser or the like and is connected to each of the slanted light-emitting fiber 21a, slanted light-emitting fiber 22a, parallel light-emitting fiber 23a, and parallel light-emitting fiber 24a. The light beam outputted from the light source 31 is emitted toward the outer peripheral surface 12a of the rotor 12 via each of the slanted light-emitting fiber 21a, slanted light-emitting fiber 22a, parallel light-emitting fiber 23a, and parallel light-emitting fiber 24a. Note that the light source 31 may be a single light source or may be a plurality of the same light sources. In the case where the light source 31 is a single light source, the optical path of the single light source is branched into four optical paths, and light beams are outputted from branched optical paths to the slanted light-emitting fiber 21a, slanted light-emitting fiber 22a, parallel light-emitting fiber 23a, and parallel light-emitting fiber 24a. In the case where the light source 31 is a plurality of light sources, for example, four light sources, light beams are outputted from the optical paths of the four light sources to the slanted light-emitting fiber 21a, slanted light-emitting fiber 22a, parallel light-emitting fiber 23a, and parallel light-emitting fiber 24a.

Here, slanted light beam OL1 from the slanted light-emitting fiber 21a and slanted light beam OL2 from the slanted light-emitting fiber 22a form the triangle in triangulation described above. In other words, the two slanted light beams OL1 and OL2 are light beams for triangulation, as in conventional devices. Parallel light beam PL1 from the parallel light-emitting fiber 23a and parallel light beam PL2 from the parallel light-emitting fiber 24a are parallel light beams with a distance L. These two parallel light beams PL1 and PL2 are light beams for measuring thermal elongation of the light sensor 20, as described later. Note that angle θ1 formed by slanted light beam OL1 and parallel light beam PL1 and angle θ2 formed by slanted light beam OL2 and parallel light beam PL2 do not need to be equal to each other.

Slanted light beam OL1 emitted from the one slanted light-emitting fiber 21a is reflected by the target 13, the reflected light is received by the multiple slanted light-receiving fibers 21b, and the intensity of the received light signal OS1 is detected by the light-receiving element 32. In the same way, slanted light beam OL2 emitted from the one slanted light-emitting fiber 22a is reflected by the target 13, the reflected light is received by the multiple slanted light-receiving fibers 22b, and the intensity of the received light signal OS2 is detected by the light-receiving element 33.

In addition, parallel light beam PL1 emitted by the one parallel light-emitting fiber 23a is reflected by the target 13, the reflected light is received by the multiple parallel light-receiving fibers 23b, and the intensity of the received light signal PS1 is detected by the light-receiving element 34. In the same way, parallel light beam PL2 emitted from the one parallel light-emitting fiber 24a is reflected by the target 13, the reflected light is received by the multiple parallel light-receiving fibers 24b, and the intensity of the received light signal PS2 is detected by the light-receiving element 35.

Figure 3A:
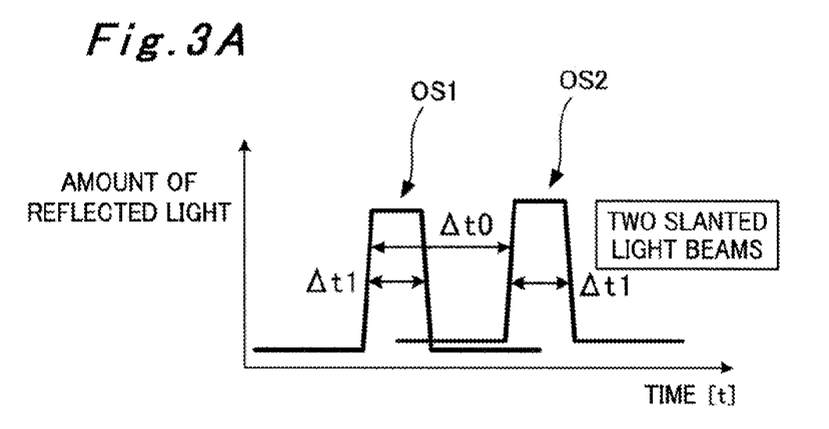
FIG. 3A shows a graph indicating the amounts of reflected light of two slanted light beams measured with the optical measurement device illustrated in FIG. 1.
Figure 3B:
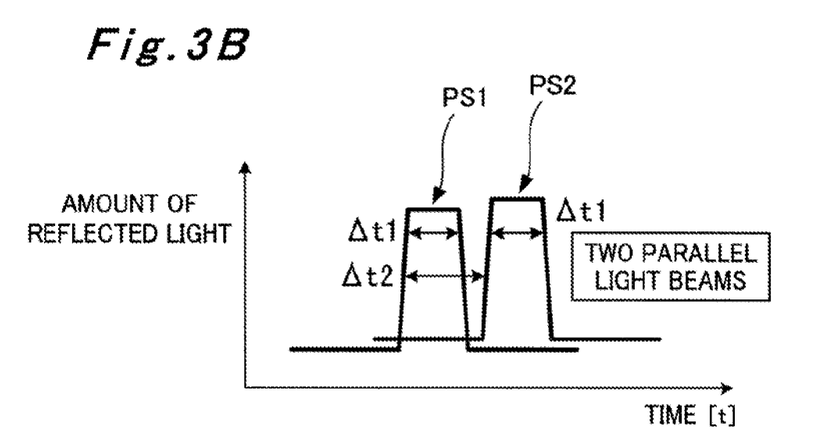
FIG. 3B shows a graph indicating the amounts of reflected light of two parallel light beams measured with the optical measurement device illustrated in FIG. 1.

Then, two waveforms as illustrated in the graph of FIG. 3A are obtained by the pair of light-receiving elements 32 and 33 (first light-receiving elements), and two waveforms as illustrated in in the graph of FIG. 3B are obtained by the pair of light-receiving elements 34 and 35 (second light-receiving elements). The waveforms in the graph of FIG. 3A correspond to light signals OS1 and OS2, and the waveforms in the graph of FIG. 3B correspond to light signals PS1 and PS2.

In this example, the light signal computation unit 40 performs the following calculations (1) to (3) according to the following procedure on the basis of the four waveforms illustrated in the graphs of FIGS. 3A and 3B, to calculate clearance d.

(1) Calculation of Peripheral Speed v

Using one of the four waveforms illustrated in the graphs of FIGS. 3A and 3B, time difference Δt1 (first time difference) is calculated from the two times of the rising edge and the falling edge of the waveform. Next, using the width w of the target 13, peripheral speed v is calculated by v=w/Δt1. Here, it is desirable to use one of the two waveforms of light signals PS1 and PS2 generated by parallel light beams PL1 and PL2.

Note that the average value of multiple time differences Δt1 may be calculated using two or more of the four waveforms, and the average value may be used as the final time difference Δt1. In this case, it is desirable to use the two waveforms of light signals PS1 and PS2 generated by parallel light beams PL1 and PL2.

(2) Calculation of Interval AB

Using the two waveforms illustrated in the graph of FIG. 3B, in other words, the two waveforms of light signals PS1 and PS2 generated by parallel light beams PL1 and PL2, time difference Δt2 (second time difference) is calculated from two times at which the target 13 passes by two parallel light beams PL1 and PL2. Next, using the calculated peripheral speed v, interval AB is calculated by the formula, interval AB=v×Δt2.

In conventional methods, for the dimension of interval AB, the dimension at production is used. However, in this example, the interval AB affected by the thermal elongation is calculated by calculating time difference Δt2, and this reduces errors caused by thermal elongation.

(3) Calculation of Clearance d

Using the two waveforms illustrated in the graph of FIG. 3A in other words, the two waveforms of light signals OS1 and OS2 generated by slanted light beams OL1 and OL2, time difference Δt0 (third time difference) is calculated from two times at which the target 13 passes by two slanted light beams OL1 and OL2. This time difference Δt0 is Δt in the formula 1 described above. Thus, clearance d can be calculated using calculated peripheral speed v and interval AB (=L) from the formula 1 described above. Here, clearance d is calculated using interval CD=v×Δt instead of interval CD=2×R×π×N×Δt as interval. CD, and thus radius R which is varied due to thermal elongation or centrifugal elongation is not used. This makes it possible to reduce errors due to thermal elongation or centrifugal elongation on the rotary side.

In this example, the thermal elongation (thermal elongation of interval AB) of the light sensor 20 is calculated with the configuration and method described above. This eliminates measurement errors in clearance d resulting from change (change in interval AB) due to thermal elongation of the light sensor 20 and change (change in radius R) due to thermal elongation and centrifugal elongation on the rotary side, making it possible to calculate clearance d more accurately.

EXAMPLE 2

An optical measurement device in this example is based on the optical measurement device illustrated in the above Example 1. For this reason, here, the same constituents as in the optical measurement device of Example 1 illustrated in FIGS. 1 and 2 are denoted by the same reference signs, and description of the same constituents is omitted.

Figure 4:
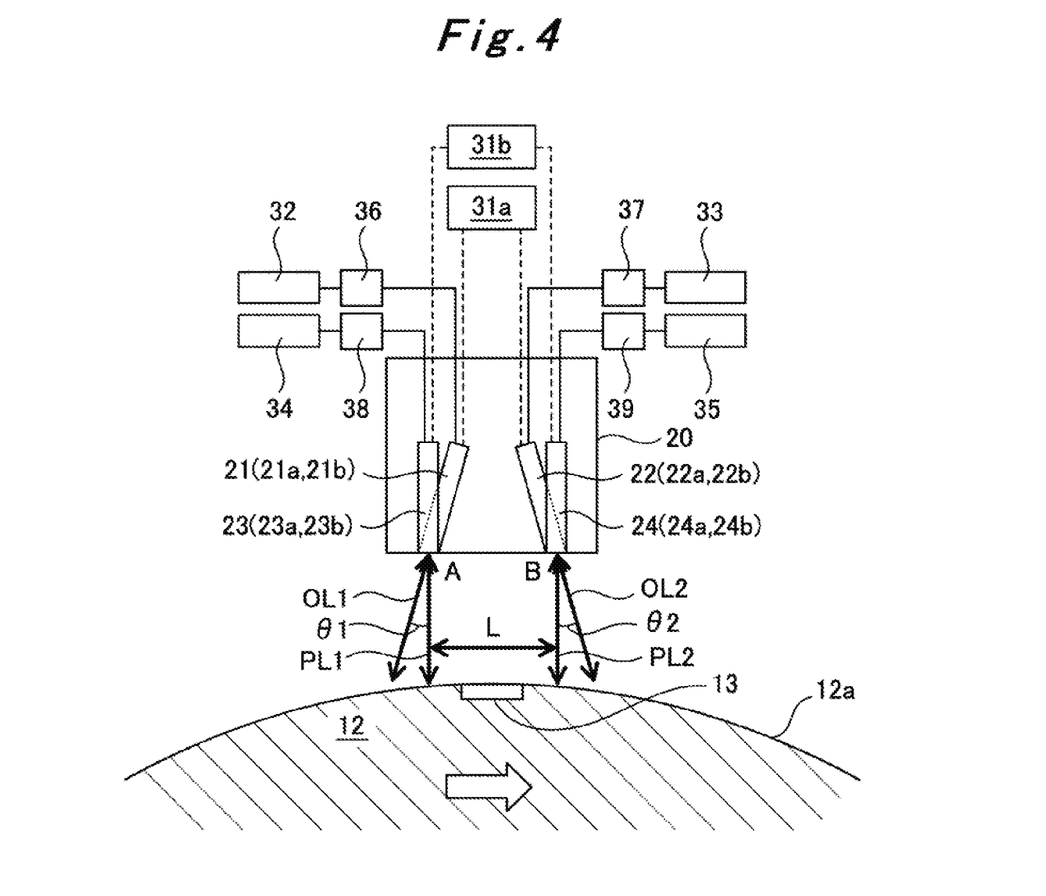
FIG. 4 is a diagram illustrating another example (Example 2) of an embodiment of an optical measurement device according to the present invention, which is a structure diagram illustrating the device structure.

As illustrated in FIG. 4, the optical measurement device in this example further has two light sources 31a and 31b and filters 36 to 39. The light sources 31a and 31b (the first light source and the second light source) output light beams with wavelengths different from each other (first light and second light). In Example 1, the light source 31 is connected to all of the slanted light-emitting fiber 21a, slanted light-emitting fiber 22a, parallel light-emitting fiber 23a, and parallel light-emitting fiber 24a. Here, the light source 31a is connected to the slanted light-emitting fiber 21a and the slanted light-emitting fiber 22a, and the light source 31b is connected to the parallel light-emitting fiber 23a and the parallel light-emitting fiber 24a. In other words, slanted light beams OL1 and OL2 emitted from the slanted light-emitting fiber 21a and the slanted light-emitting fiber 22a and parallel light beams PL1 and PL2 emitted from the parallel light-emitting fiber 23a and the parallel light-emitting fiber 24a have different wavelengths (colors).

The filters 36 and 37 (first filters) transmit only light with the wavelength outputted from the light source 31a, and the filters 38 and 39 (second filters) transmit only light with the wavelength outputted from the light source 31b. To be adapted to the slanted light-emitting fiber 21a and the slanted light-emitting fiber 22a to which the light source 31a is connected, the filter 36 is arranged between the slanted light-receiving fibers 21b and the light-receiving element 32, and the filter 37 is arranged between the slanted light-receiving fibers 22b and the light-receiving element 33. Similarly, to be adapted to the parallel light-emitting fiber 23a and the parallel light-emitting fiber 24a to which the light source 31b is connected, the filter 38 is arranged between the parallel light-receiving fibers 23b and the light-receiving element 34, and the filter 39 is arranged between the parallel light-receiving fibers 24b and the light-receiving element 35.

With the configuration described above, in the case where the reflected light from slanted light beams OL1 and OL2 and the reflected light from parallel light beams PL1 and PL2 interfere with each other, the reflected light from the other, which are disturbances, can be excluded.

For example, when it is assumed that the first light outputted from the light source 31a is light with a wavelength of green (hereinafter, called green light beam), and that the second light outputted from the light source 31b is light with a wavelength of red (red light beam), slanted light beams OL1 and OL2 are green light beams, and parallel light beams PL1 and PL2 are red light beams. In this case, the reflected light beams toward the slanted light-receiving fibers 21b and the slanted light-receiving fibers 22b are green light beams, but red light beams irregularly reflected may interfere with these green light beams. Even in this case, the filters 36 and 37 exclude the interfering red light beams and transmit only the green light beams to the light-receiving elements 32 and 33, allowing the light-receiving elements 32 and 33 to detect the intensity of only the green light beams. Similarly, the reflected light beams toward the parallel light-receiving fibers 23b and the parallel light-receiving fibers 24b are red light beams, but green light beams irregularly reflected may interfere with these red light beams. Even in this case, the filters 38 and 39 exclude the interfering green light beams and transmit only the red light beams to the light-receiving elements 34 and 35, allowing the light-receiving elements 34 and 35 to detect the intensity of only the red light beams.

In this case, it is desirable that the light-receiving elements 32 and 33 have high receiving sensitivities for wavelengths of green light beams and that the light-receiving elements 34 and 35 have high receiving sensitivities for wavelengths of red light beams.

As described above, since the light sources 31a and 31b that output light beams with wavelengths different from each other as light sources are used; even when the reflected light from slanted light beams OL1 and OL2 and the reflected light from parallel light beams PL1 and PL2 interfere with each other, the filters 36 to 39 can exclude disturbance reflected light of the other. This prevents the deterioration of the SN ratio (signal-to-noise ratio) and thus prevents the deterioration of the measurement accuracy.

INDUSTRIAL APPLICABILITY

The present invention is suitable for measurement targeting rotary members of rotating machines (for example, turbomachines, such as turbines and compressors). For example, the present invention is applicable to clearance measurement for reducing internal leakage and avoiding rubbing in a turbine.

REFERENCE SIGNS LIST 10 rotating machine
12 rotor
13 target
20 light sensor
21, 22 slanted fiber bundle
21a, 22a slanted light-emitting fiber
21b, 22b slanted light-receiving fiber
23, 24 parallel fiber bundle
23a, 24a parallel light-emitting fiber
23b, 24b parallel light-receiving fiber
30 light signal processor
31, 31a, 31b light source
32, 33, 34, 35 light-receiving element
36, 37, 38, 39 filter
40 light signal computation unit

The invention claimed is:

1. An optical measurement device comprising:
a pair of first fiber bundles having a pair of first light-emitting fibers, distal ends of which are arranged at a specified interval, and a pair of first light-receiving fibers, distal ends of which are arranged at the specified interval, in a light sensor, the pair of first fiber bundles being arranged to be slanted to respectively form two sides of a triangle in triangulation;
a pair of second fiber bundles having a pair of second light-emitting fibers, distal ends of which are arranged at the specified interval, and a pair of second light-receiving fibers, distal ends of which are arranged at the specified interval, in the light sensor, the pair of second fiber bundles being arranged in parallel with each other;
a light source that outputs light to the pair of first light-emitting fibers and the pair of second light-emitting fibers to emit two slanted light beams from the pair of first light-emitting fibers and emit two parallel light beams from the pair of second light-emitting fibers, wherein
a target of the light emitted from the first light-emitting fibers and the second light-emitting fibers is provided on an outer peripheral surface of a rotary member, reflects the two slanted light beams to the pair of first light-receiving fibers, respectively, and reflects the two parallel light beams to the pair of second light-receiving fibers, respectively;
a pair of first light-receiving elements each of which is connected to the corresponding one of the pair of first light-receiving fibers and detects intensity of the light received by the first light-receiving element;
a pair of second light-receiving elements each of which is connected to the corresponding one of the pair of second light-receiving fibers and detects intensity of the light received by the second light-receiving element; and
a computation unit that performs calculation including the specified interval affected by thermal elongation, using four waveforms indicating changes in the intensity respectively detected by the pair of first light-receiving elements and the pair of second light-receiving elements.

2. The optical measurement device according to claim, wherein
the computation unit
calculates a first time difference from two times of a rising edge and a falling edge of each of the four waveforms and calculates a peripheral speed of the target, using one of the four first time differences or an average of two or more of the four first time differences,
calculates a second time difference from two times at which the target passes by the two parallel light beams using two of the waveforms detected by the pair of second light-receiving elements and calculates the specified interval affected by thermal elongation using the second time difference, and
calculates a third time difference from two times at which the target passes by the two slanted light beams using two of the waveforms detected by the pair of first light-receiving elements and calculates distance from the distal ends of the pair of first light-emitting fibers to the target using the third time difference.

3. The optical measurement device according to claim 2, wherein
the light source has a first light source that outputs first light to the pair of first light-emitting fibers and a second light source that outputs second light with a wavelength different from a wavelength of the first light to the pair of second light-emitting fibers, and
the optical measurement device further includes
a first filter that is provided between the pair of first light-receiving fibers and the pair of first light-receiving elements and transmits only the first light and
a second filter that is provided between the pair of second light-receiving fibers and the pair of second light-receiving elements and transmits only the second light.

4. A rotating machine comprising the optical measurement device according to claim 3.

5. The optical measurement device according to claim 1, wherein
the light source has a first light source that outputs first light to the pair of first light-emitting fibers and a second light source that outputs second light with a wavelength different from a wavelength of the first light to the pair of second light-emitting fibers, and
the optical measurement device further includes
a first filter that is provided between the pair of first light-receiving fibers and the pair of first light-receiving elements and transmits only the first light and
a second filter that is provided between the pair of second light-receiving fibers and the pair of second light-receiving elements and transmits only the second light.

6. A rotating machine comprising the optical measurement device according to claim 1.

7. A rotating machine comprising the optical measurement device according to claim 2.

8. A rotating machine comprising the optical measurement device according to claim 5.

9. An optical measurement method comprising:
arranging, in a light sensor, a pair of first fiber bundles having a pair of first light-emitting fibers, distal ends of which are arranged at a specified interval, and a pair of first light-receiving fibers, distal ends of which are arranged at the specified interval, such that the pair of first fiber bundles are slanted to respectively form two sides of a triangle in triangulation;
arranging, in the light sensor, a pair of second fiber bundles having a pair of second light-emitting fibers, distal ends of which are arranged at the specified interval, and a pair of second light-receiving fibers, distal ends of which are arranged at the specified interval, such that the pair of second fiber bundles are in parallel with each other;
outputting light from a light source to the pair of first light-emitting fibers and the pair of second light-emitting fibers to emit two slanted light beams from the pair of first light-emitting fibers and emit two parallel light beams from the pair of second light-emitting fibers;
reflecting the two slanted light beams to the pair of first light-receiving fibers, respectively, and reflecting the two parallel light beams to the pair of second light-receiving fibers, respectively, using a target provided on an outer peripheral surface of a rotary member;
detecting, using each of a pair of first light-receiving elements connected to the corresponding one of the pair of first light-receiving fibers, intensity of the light received by the first light-receiving element;
detecting, using each of a pair of second light-receiving elements connected to the corresponding one of the pair of second light-receiving fibers, intensity of the light received by the second light-receiving element; and
performing calculation including the specified interval affected by thermal elongation, using four waveforms indicating changes in the intensity respectively detected by the pair of first light-receiving elements and the pair of second light-receiving elements.

10. The optical measurement method according to claim 9, further comprising:

calculating a first time difference from two times of a rising edge and a falling edge of each of the four waveforms and calculating a peripheral speed of the target using one of the four first time differences or an average of two or more of the four first time differences;

calculating a second time difference from two times at which the target passes by the two parallel light beams using two of the waveforms detected by the pair of second light-receiving elements and calculating the specified interval affected by thermal elongation using the second time difference; and calculating a third time difference from two times at which the target passes by the two slanted light beams using two of the waveforms detected by the pair of first light-receiving elements and calculating distance from the distal ends of the pair of first light-emitting fibers to the target using the third time difference.

* * * * *